United States Patent
Niitsuma

(10) Patent No.: US 9,215,865 B2
(45) Date of Patent: Dec. 22, 2015

(54) DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/463,197

(22) Filed: Aug. 19, 2014

(65) Prior Publication Data

US 2015/0076269 A1 Mar. 19, 2015

(30) Foreign Application Priority Data

Sep. 13, 2013 (JP) .................. 2013-190358

(51) Int. Cl.
*A01K 89/01* (2006.01)
*A01K 89/015* (2006.01)

(52) U.S. Cl.
CPC .................... *A01K 89/015* (2013.01)

(58) Field of Classification Search
CPC ............ A01K 89/015; A01K 89/0192; A01K 89/01922; A01K 89/01923
See application file for complete search history.

(56) References Cited

U.S. PATENT DOCUMENTS

| | | | | |
|---|---|---|---|---|
| 6,095,444 A * | 8/2000 | Miyazaki | ............ | A01K 89/015 242/310 |
| 6,464,158 B1 * | 10/2002 | Sakurai | ................ | A01K 89/006 242/283 |
| 2004/0079822 A1 * | 4/2004 | Kawasaki | ............ | A01K 89/015 242/322 |
| 2005/0224617 A1 * | 10/2005 | Nakagawa | ........... | A01K 89/015 242/310 |
| 2006/0006267 A1 * | 1/2006 | Hirayama | ............ | A01K 89/015 242/223 |
| 2007/0246590 A1 * | 10/2007 | Hyun | ................... | A01K 89/015 242/310 |
| 2010/0038464 A1 * | 2/2010 | Nakagawa | ........... | A01K 89/015 242/321 |
| 2014/0263792 A1 * | 9/2014 | Takechi | ............... | A01K 89/015 242/257 |

FOREIGN PATENT DOCUMENTS

JP 11-243819 A 9/1999

* cited by examiner

*Primary Examiner* — Emmanuel M Marcelo
(74) *Attorney, Agent, or Firm* — Global IP Counselors

(57) ABSTRACT

A cover open mechanism of a dual-bearing reel includes a frame, a first side cover, a spool support portion and a cover opening and closing portion. The cover opening and closing portion includes a cover opening and closing structure and an urging member. The cover opening and closing structure is engaged with the spool support portion and the first side cover, and sets an opened/closed state of the first side cover. The urging member is disposed between the first side cover and the cover opening and closing structure, and urges the first side cover in an openable state. The first side cover is configured to be prevented from rotating when any one of the first side cover and the spool support portion is engaged with the other of the first side cover and the spool support portion.

7 Claims, 11 Drawing Sheets

DUAL-BEARING REEL

CROSS-REFERENCE TO RELATED APPLICATIONS

This application claims priority to Japanese Patent Application No. 2013-190358 filed on Sep. 13, 2013, the entirety of which is hereby incorporated by reference in its entirety.

BACKGROUND

1. Field of the Invention

The present invention relates to a dual-bearing reel, particularly to a dual-bearing reel including a cover open mechanism for opening a cover portion.

2. Background Information

As described in Publication of Japan Patent No. 3560459, there is a type of dual-bearing reel equipped with a mechanism for opening a side cover disposed oppositely to a handle (hereinafter referred to as a cover open mechanism). In the cover open mechanism, the side cover is outwardly urged in a closing direction by an urging member. For example, when changing a closed state of the side cover into an opened state, a user is required to manually rotate the side cover outwardly pushed by the urging member. Thus, the side cover is opened. When herein maintaining the opened state of the side cover, the user is required to manually hold the side cover. On the other hand, when changing the opened state of the side cover into the closed state, the user is required to lose hold of the side cover set in the opened state. Thus, the side cover set in the opened state is closed by the urging member. When closing the side cover, the user is required to push the side cover toward a reel unit.

In the well-known dual-bearing reel as described above, when trying to open the side cover, the user is required to manually rotate the side cover. Further, when trying to access the internal structure of the well-known dual-bearing reel, the user is also required to continuously maintain the side cover in the opened state. Thus, when the side cover has been opened by the left hand, for instance, the user is required to continuously maintain the opened state of the side cover by the left hand. In other words, the well-known dual-bearing reel has had the drawback that the user cannot easily perform an operation, work and so forth for the internal structure of the well-known dual-bearing reel.

SUMMARY

The present invention has been produced in view of the aforementioned drawback. It is an object of the present invention to enable a cover portion of a dual-bearing reel to be easily opened so as to enhance operability and workability for an internal structure of the dual-bearing reel.

A dual-bearing reel according to a first aspect of the invention includes a reel unit, a spool, a handle and a cover open mechanism. The reel unit includes a frame body and a cover portion. The frame body includes an opening portion. The cover portion is allowed to be disposed in the opening portion. The spool is rotatably mounted on the frame body. The handle is configured to rotate the spool.

The cover open mechanism is configured to open the cover portion. The cover open mechanism includes the frame body, the cover portion, a spool support portion and a cover opening and closing portion. The spool support portion is mounted to an interior of the frame body and is configured to support the spool in a rotatable state. The cover opening and closing portion is disposed between the spool and the cover portion in the interior of the frame body.

The cover opening and closing portion includes a cover opening and closing structure and an urging member. The cover opening and closing structure is engaged with the spool support portion and the cover portion, and sets an opened/closed state of the cover portion. The urging member is disposed between the cover portion and the cover opening and closing structure, and urges the cover portion in an openable state. The cover portion is configured to be prevented from rotating when any one of the cover portion and the spool support portion is engaged with the other of the cover portion and the spool support portion.

In the present dual-bearing reel, the cover portion is configured to be opened by the urging member when the closed state of the cover portion is released by the cover opening and closing structure. Further, the cover portion is configured to be prevented from rotating when any one of the cover portion and the spool support portion is locked to the other of the cover portion and the spool support portion.

Thus, in the present dual-bearing reel, the cover portion can be automatically opened, and further, the opened cover portion can be retained while being prevented from rotating. In other words, in the present dual-bearing reel, the cover portion can be easily opened. Further, in the present dual-bearing reel, the cover portion can be retained while being opened. Accordingly, it is possible to enhance operability and workability for the internal structure of the dual-bearing reel.

A dual-bearing reel according to a second aspect of the invention relates to the dual-bearing reel recited in the first aspect of the invention. In the dual-bearing reel, any one of the cover portion and the spool support portion includes a protruding part. The other of the cover portion and the spool support portion includes a contact part contactable to the protruding part.

In the present dual-bearing reel, the cover portion is prevented from rotating by contacting the protruding part and the contact part to each other. In other words, in the present dual-bearing reel, the cover portion can be reliably retained while being opened. Accordingly, it is possible to enhance operability and workability for the internal structure of the dual-bearing reel.

A dual-bearing reel according to a second aspect of the invention relates to the dual-bearing reel recited in the first or second aspect of the invention. In the dual-bearing reel, the urging member is configured to change a position of the cover portion from a closed position to an opened position. The closed position causes the cover portion to close the opening portion, whereas the opened position causes the cover portion to at least partially open the opening portion.

In the present dual-bearing reel, the urging member is configured to change the position of the cover portion from the closed position to the opened position. Therefore, a user can open the cover portion not manually but automatically.

A dual-beating reel according to a fourth aspect of the invention relates to the dual-bearing reel recited in the third aspect of the invention. In the dual-bearing reel, the urging member is configured to change the position of the cover portion from the closed position to an openable position in which the opening portion is openable. Further, the urging member is configured to change the position of the cover portion from the openable position to the opened position.

In the present dual-bearing reel, the urging member is configured to change the position of the cover portion in multiple stages in the sequential order of the closed position, the openable position and the opened position. Thus, the position of the cover portion is changed from the closed position to the opened position via the openable position. Accordingly, the cover portion can be smoothly and automatically opened by the urging member even when the closed position and the opened position are greatly different from each other.

A dual-bearing reel according to a fifth aspect of the invention relates to the dual-bearing reel recited in the fourth aspect of the invention. In the dual-bearing reel, the cover opening and closing structure is configured to support the cover portion such that the cover portion proceeds in a direction away from the spool and retracts in a direction closer to the spool between the closed position and the openable position. Further, the cover opening and closing structure is configured to support the cover portion such that the cover portion pivots between the openable position and the opened position. The urging member is configured to urge the cover portion from the closed position to the openable position. Further, the urging member is configured to urge the cover portion from the openable position to the opened position.

In the present dual-bearing reel, the urging member is configured to urge the cover portion in accordance with a form in which the cover portion is supported by the cover opening and closing structure. Hence, the position of the cover portion can be smoothly and automatically changed.

A dual-bearing reel according to a sixth aspect of the invention relates to the dual-bearing reel recited in the fifth aspect of the invention. In the dual-bearing reel, the cover portion include a coupling part to be coupled to the cover opening and closing structure. The cover opening and closing structure includes a support portion. The support portion is mounted to the coupling part. The support portion supports the cover portion such that the cover portion proceeds and retracts and the cover portion pivots. The urging member includes a torsion spring part, a first lock part and a second lock part. The torsion spring part is mounted to at least either of an outer periphery of the coupling part and an outer periphery of the support portion. The torsion spring part is extendable and contractable on at least either of the outer periphery of the coupling part and the outer periphery of the support portion. The first lock part is locked to the cover portion. The second lock part is locked to the cover opening and closing structure.

In the present dual-bearing reel, the position of the cover portion is changed from the closed position to the openable position by means of an extension force of the torsion spring part. Further, the position of the cover portion is changed from the openable position to the opened position by means of a reaction force of a torsional force of the torsion spring part. Accordingly, the cover portion can be smoothly and automatically opened by the single urging member, even when the position of the cover member is changed in multiple stages.

According to the present invention, the cover portion of the dual-bearing reel can be easily opened, and it is possible to enhance operability and workability for the internal structure of the dual-bearing reel.

BRIEF DESCRIPTION OF THE DRAWINGS

Referring now to the attached drawings which form a part of this original disclosure.

DETAILED DESCRIPTION OF EMBODIMENTS

<Basic Structure of Dual-bearing Reel>

Figure 1:
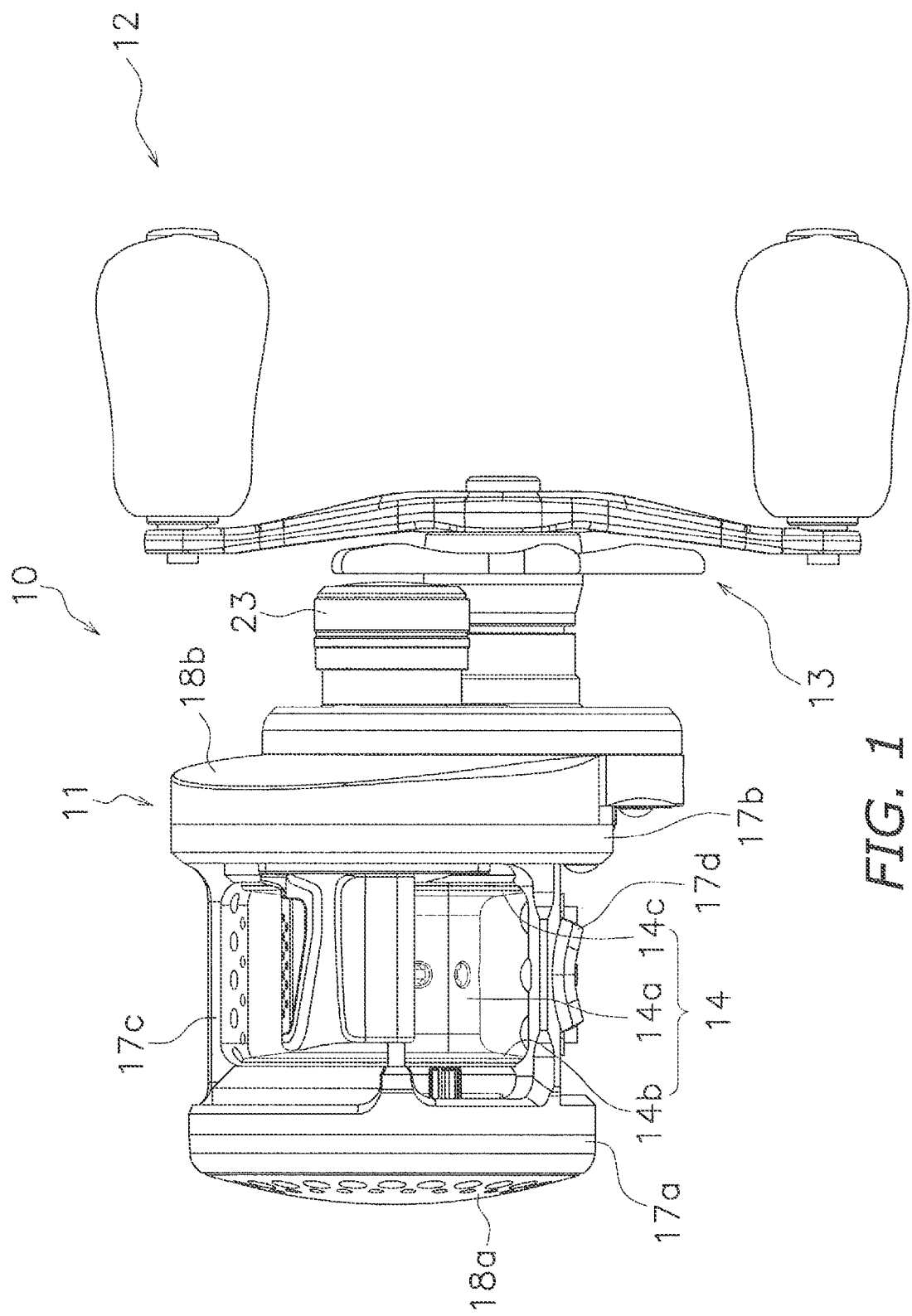
FIG. 1 is a plan view of a dual-bearing reel according to an exemplary embodiment of the present invention.
Figure 2:
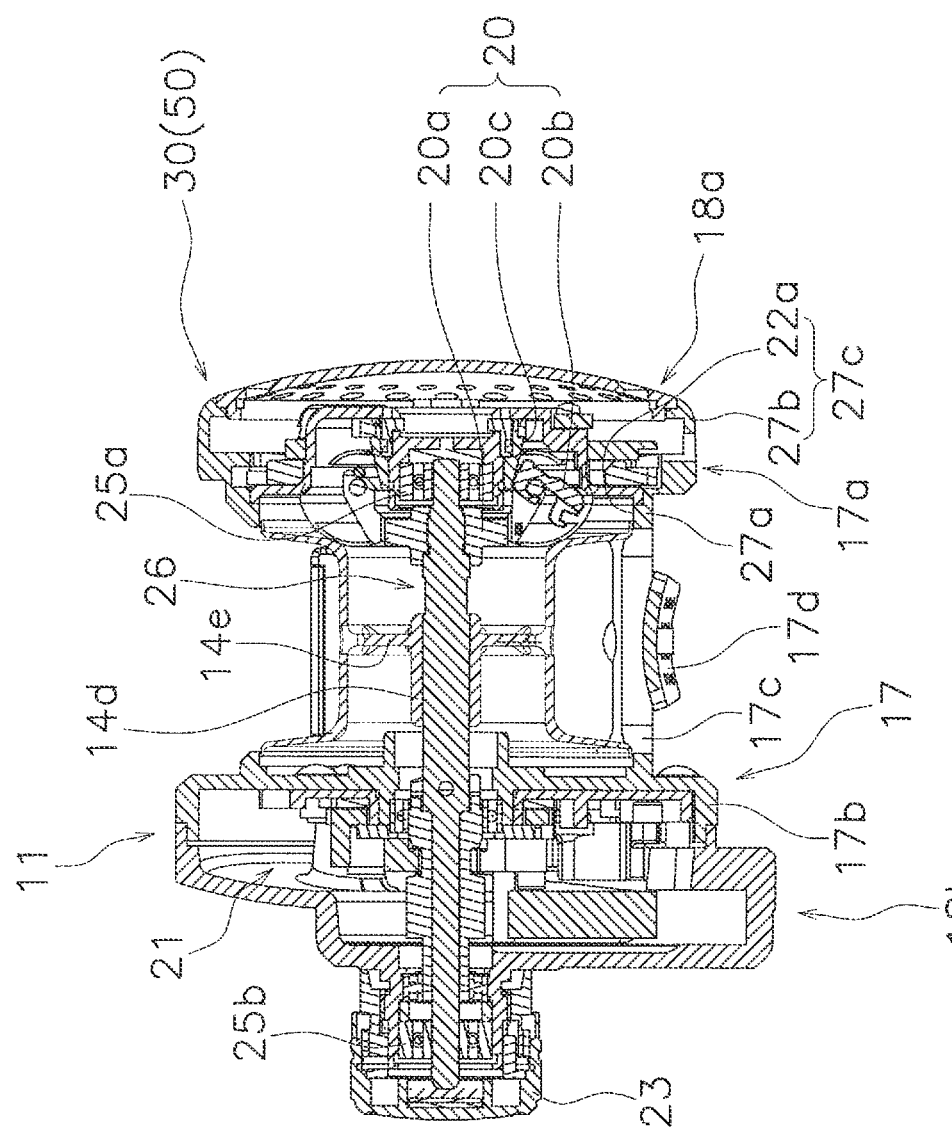
FIG. 2 is a cross-sectional view of the dual-bearing reel.

As illustrated in FIGS. 1 and 2, a dual-bearing reel 10 mainly includes a reel unit 11 to be attached to a fishing rod, a handle 12, a star drag 13, a spool 14, a spool shaft 26, a spool access mechanism 30 and a cover open mechanism 50. The cover open mechanism 50 (to be described) is included in the spool access mechanism 30 as an element of the spool access mechanism 30. Further, a part of the reel unit 11 (e.g., a frame 17) is included in the spool access mechanism 30 as another element of the spool access mechanism 30.

As illustrated in FIG. 1, the handle 12 is a member for spool rotation. The handle 12 is disposed laterally to the reel unit 11. The star drag 13 is a member for drag regulation, and is disposed on the reel unit 11 side of the handle 12.

The spool 14 is rotatably mounted to the reel unit 11. The spool 14 has a bobbin trunk 14a, a right-and-left pair of a first flange 14b and a second flange 14c. The bobbin trunk 14a is a tubular part that a fishing line is wound thereabout. The first and second flanges 14b and 14c are large-diameter parts formed on the both ends of the bobbin trunk 14a. The first flange 14b is disposed on the opposite side of the handle 12, whereas the second flange 14c is disposed on the same side as the handle 12. An attachment part 14d (see FIG. 2) is disposed on the inner peripheral side of the bobbin trunk 14a. The attachment part 14d is a tubular part to which the spool shaft 26 is coupled so as to be unitarily rotatable therewith. The attachment part 14d is integrally formed with the bobbin trunk 14a through a disc-shaped coupling part 14e (see FIG. 2). Thus, a space is produced on the inner peripheral side of the bobbin trunk 14a of the spool 14.

One end (the right end in FIG. 2) of the spool shaft 26 is rotatably supported by a first side plate 17a (to be described) of the reel unit 11 through a first bearing 25a. The other end (the left end in FIG. 2) of the spool shaft 26 is rotatably supported by a second bearing 25b disposed within a boss part disposed on a second side cover 18b (to be described) of the reel unit 11.

As illustrated in FIGS. 1 and 2, the reel unit 11 includes the frame 17 (an exemplary frame body), a first side cover 18a (an exemplary cover portion), the second side cover 18b and a fishing rod attachment part 17d. The first and second side covers 18a and 18b cover the right and left lateral sides of the frame 17. The fishing rod attachment part 17d serves to attach the dual-bearing reel 10 to the fishing rod.

Figure 3:
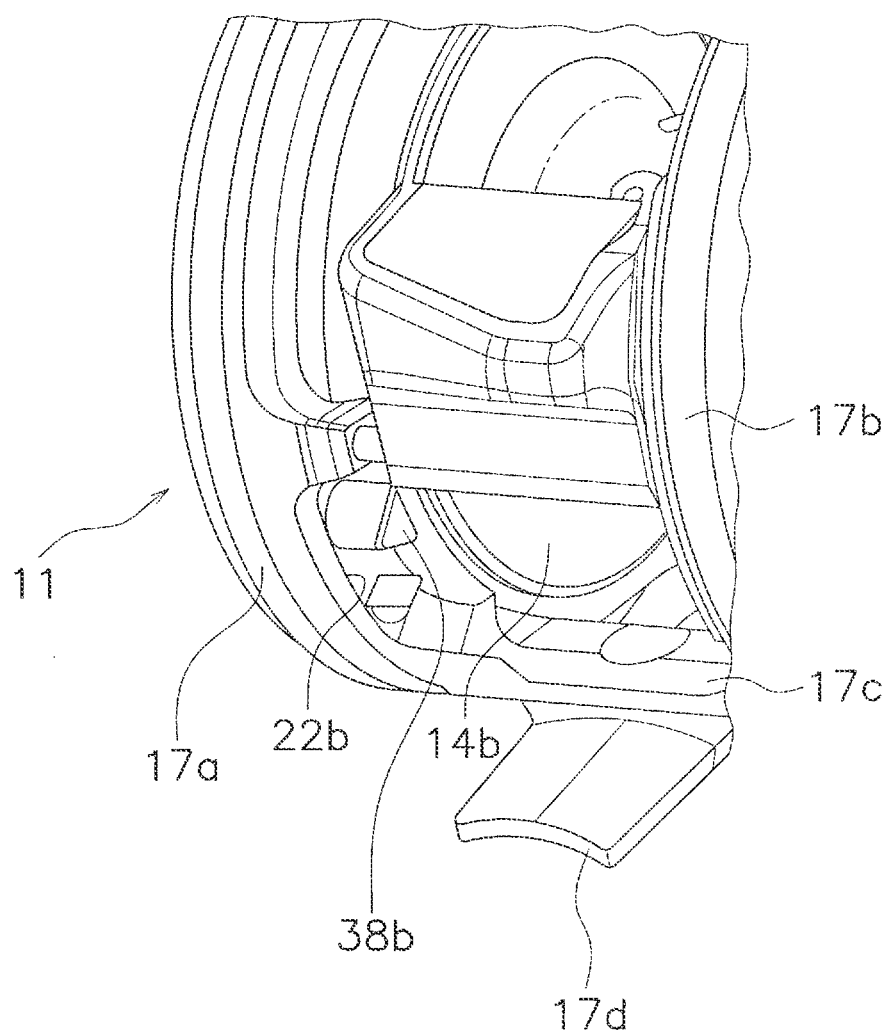
FIG. 3 is a partial perspective view of the dual-bearing reel.

The frame 17 has a tight-and-left pair of the first side plate 17a and a second side plate 17b and a plurality of coupling parts 17c. The first side plate 17a is formed in a substantially circular shape. The first side plate 17a has a first side plate main body 27a and a tubular part 27b integrally formed with the outer periphery of the first side plate main body 27a. The first side plate main body 27a has an opening 22a and an elongated aperture 22b (see FIG. 3) for a pivot member. The opening 22a and the inner periphery of the tubular part 27b compose an opening portion 27c (an exemplary opening portion) that allows the spool 14 to pass therethrough. An operating knob 38b for pivoting (to be described) is movably disposed in the pivot-member elongated aperture 22b.

Figure 4:
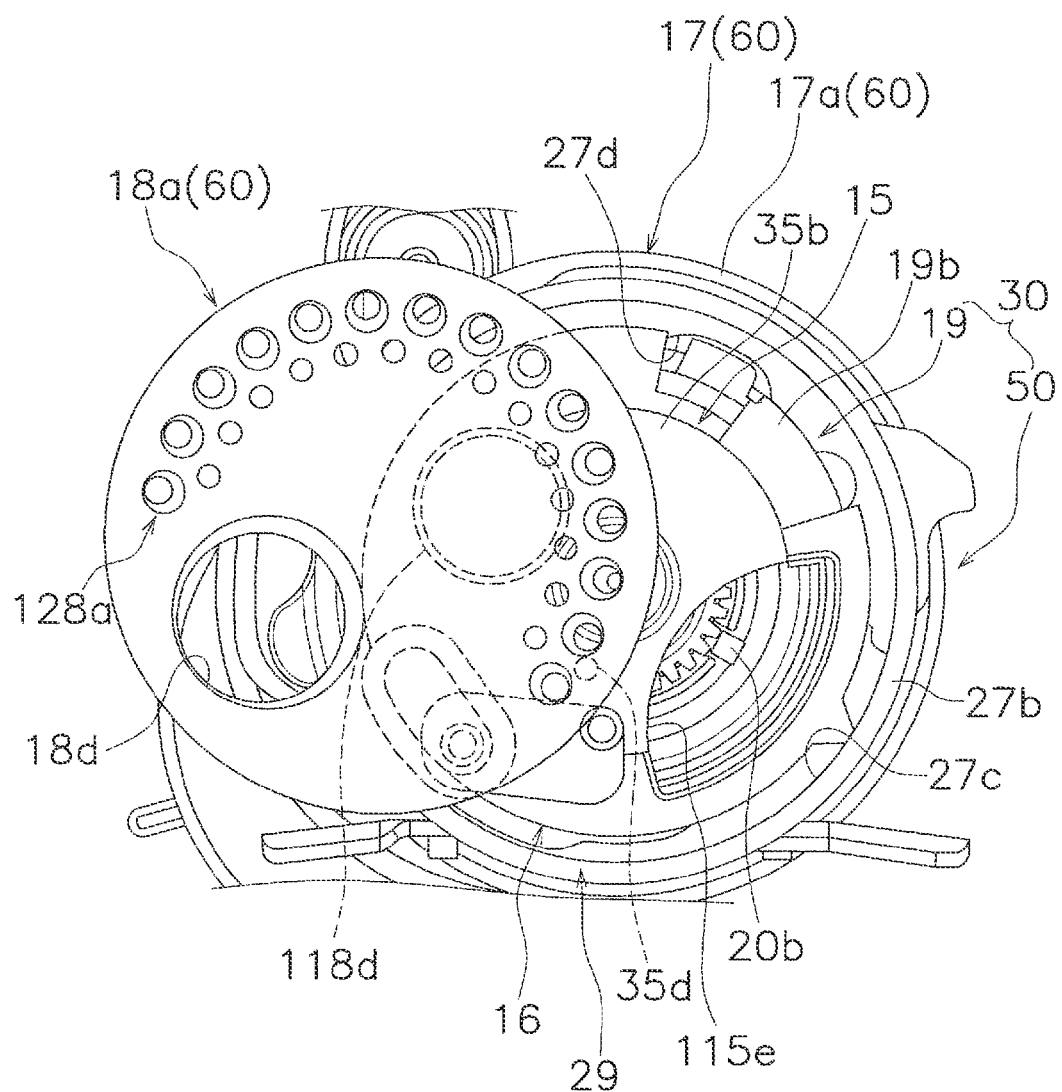
FIG. 4 is a side view of the dual-bearing reel (an opened state of a first side cover)

As illustrated in FIGS. 2 and 4, a spool support portion 15, the first side cover 18a, a cover opening and closing portion 16 (to be described) and an attachment/detachment portion 19 are disposed in the opening portion 27c, for instance, on the inner peripheral side of the tubular part 27b. When described in detail, the spool support portion 15, the first side cover 18a and the cover opening and closing portion 16 are detachably attached to the inner peripheral side of the tubular part 27b through the attachment/detachment portion 19. For example, the attachment/detachment portion 19 and the tubular part 27b are herein detachably coupled to each other by means of bayonet coupling. Detailed description will be made below for a structure for coupling the attachment/detachment portion 19 and the tubular part 27b.

Further, as illustrated in FIG. 2, a spool brake device 20 is disposed in the opening portion 27c. The spool brake device 20 serves to inhibit occurrence of backlash in casting. The spool brake device 20 is configured to brake the spool 14 in conjunction with the rotation of the spool 14. The spool brake device 20 mainly includes a rotary member 20a, a plurality of brake shoes 20b and a brake drum 20c. The rotary member 20a is mounted to the spool shaft 26 while being unitarily rotatable therewith. Each of the plural brake shoes 20b is pivotably mounted to the rotary member 20a. In the present embodiment, six brake shoes 20b are pivotably mounted to the outer periphery of the rotary member 20a. Further, the respective brake shoes 20b can be set to be non-pivotable by a lock mechanism (not illustrated in the drawings).

The brake drum 20c is configured to brake the rotation of the spool 14 when the brake shoes 20b are contacted to the brake drum 20c. The brake drum 20c is configured to be moved in either a direction closer to the spool 14 or a direction away from the spool 14 in accordance with the operating amount of a brake operating portion 118d to be described. The brake drum 20c is thus positioned.

For example, when the rotary member 20a is rotated together with the spool 14, the brake shoes 20b are pivoted by means of centrifugal force. Accordingly, the brake shoes 20b are contacted to the already positioned brake drum 20c. The rotation of the spool 14 is thus braked. It should be noted that the brake drum 20c is a member included in the spool access mechanism 30 (the spool support portion 15).

As illustrated in FIG. 2, the second side plate 17b is disposed in opposition to the first side plate 17a through the coupling parts 17c. The second side cover 18b is attached to the second side plate 17b. A casting control mechanism 21 is disposed between the second side plate 17b and the second side cover 18b. The casting control mechanism 21 serves to regulate resistive force to be applied when the spool 14 is rotated.

The plural coupling parts 17c are integrally formed with the first side plate 17a and the second side plate 17b so as to connect the first side plate 17a and the second side plate 17b.

As illustrated in FIGS. 1 and 2, the first side cover 18a is a member for covering a lateral side of the frame 17 on the handle 12 side. When described in detail, the first side cover 18a is a member for covering the opening portion 27c of the first side plate 17a. For example, the first side cover 18a can be disposed in the opening portion 27c of the first side plate 17a.

Figure 5:
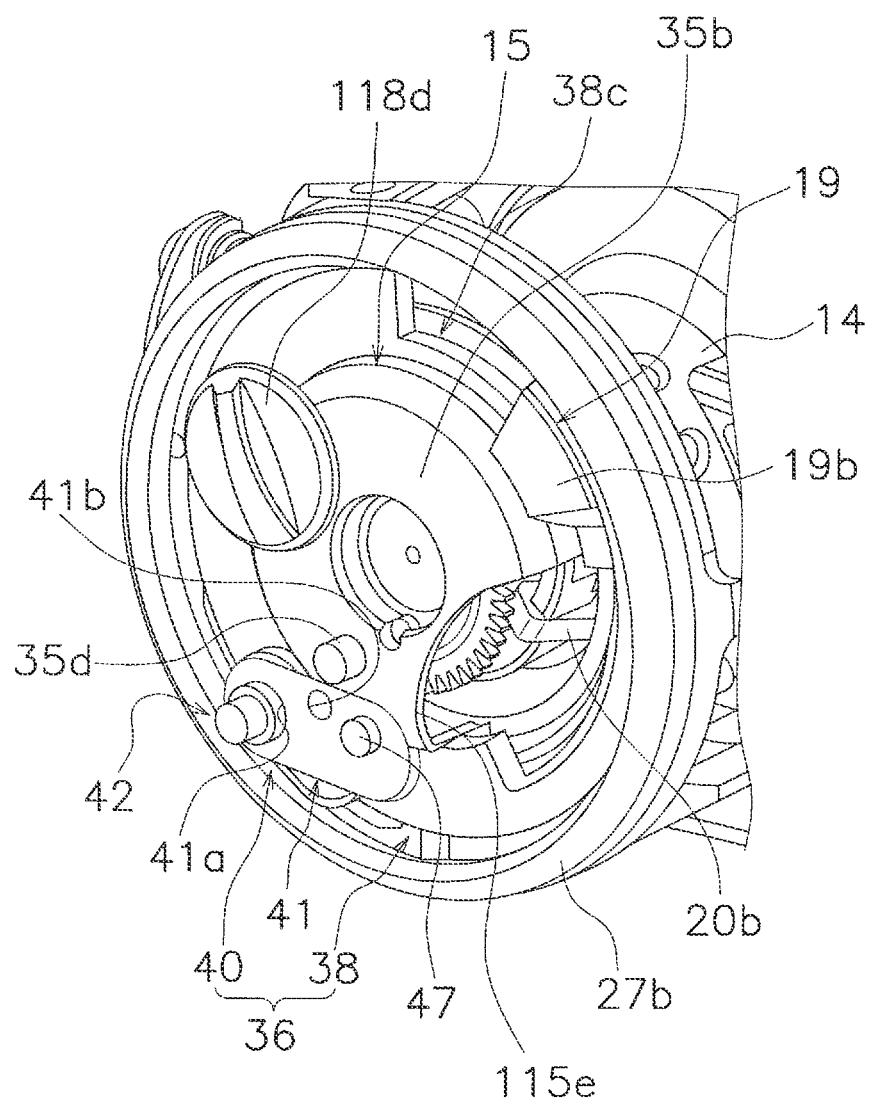
FIG. 5 is a side view of the dual-bearing reel (excluding the first side cover)
Figure 6A:
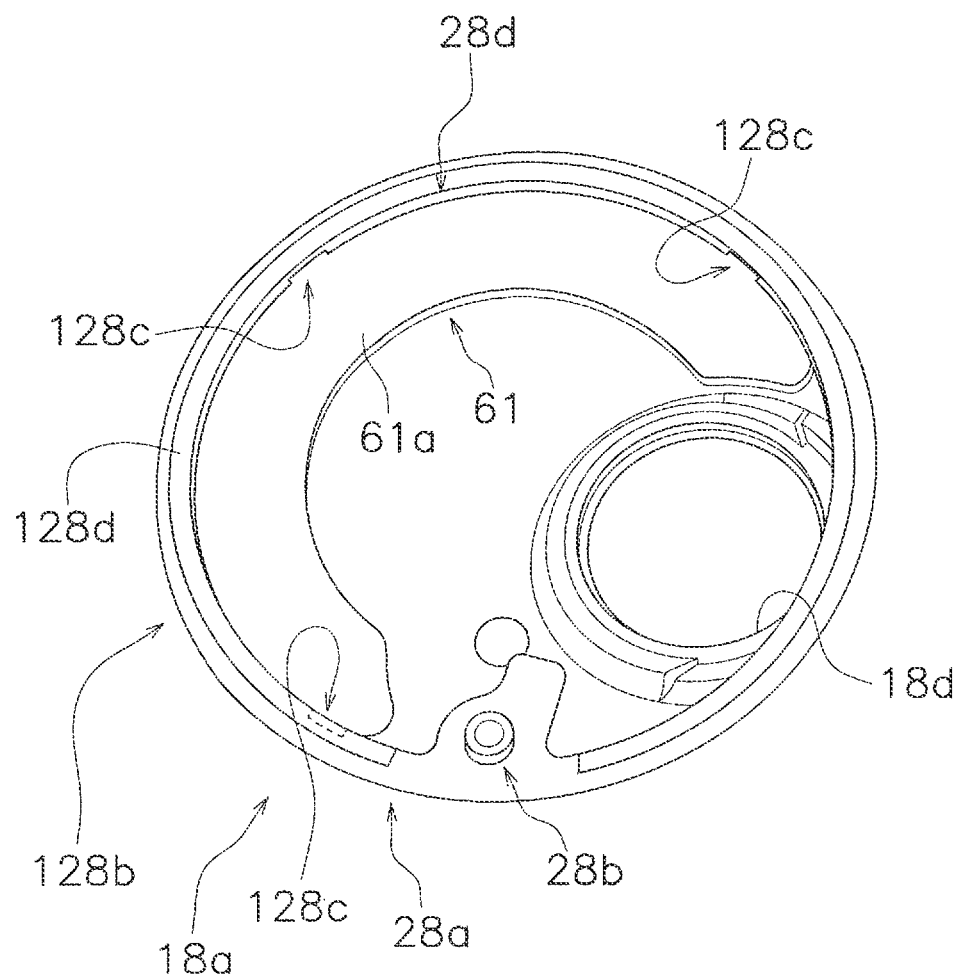
FIG. 6A is a perspective view of the first side cover.

As illustrated in FIGS. 4, 5 and 6A, the first side cover 18a includes a cover main body 28a, a support part 28b (an exemplary coupling part) and a foreign object blocking member 61. At least a part of the outer periphery of the cover main body 28a has a first curvature. In other words, at least a part of the outer periphery of the cover main body 28a is thrilled in a shape with a first curvature radius. For example, the cover main body 28a is formed in a substantially circular shape. The cover main body 28a has a plurality of apertures 128a. The plural apertures 128a are bored for weight reduction of and enhancement in design of the cover main body 28a. The cover main body 28a has a protruding part 128b formed in a substantially annular shape on the outer periphery thereof. The protruding part 128b is contacted to a contact part 35d of the spool support portion 15 to be described. Thus, rotation of the first side cover 18a is prevented at the contact part 35d.

Further as illustrated in FIG. 6A, the protruding part 128b has a plurality of holding parts 128c for holding the foreign object blocking member 61. Here, three holding parts 128c are formed on the protruding part 128b. The three holding parts 128c are firmed on the inner peripheral side of the protruding part 128b, while being circumferentially aligned at intervals. Each holding part 128c is a recess formed in a concave shape (an exemplary first convex part).

The support part 28b is provided for the cover main body 28a in order to open/close the first side cover 18a from/to the cover opening and closing portion 16. The support part 28b is integrally formed with the cover main body 28a on the opening portion 27c side of the first side plate 17a. For example, the support part 28b is formed in a cylindrical shape, and the inner periphery thereof has a female threaded part.

For example, the support part 28b is integrally formed with the cover main body 28a so as to overlap with the spool support portion 15 in a view seen in a spool shaft direction under a condition that the first side cover 18a is closed, i.e., a condition that the first side cover 18a is disposed in the opening portion 27c of the first side plate 17a. Further, the first side cover 18a has an opening 18d bored therein. The brake operating portion 8d for braking spool rotation is turnably disposed in the opening 18d.

As illustrated in FIG. 6A, the foreign object blocking member 61 is a member for blocking intrusion of a foreign object through the apertures 128a bored in the cover main body 28a of the first side cover 18a. The foreign object blocking member 61 is an elastic member. The foreign object blocking member 61 is configured to be fitted to the cover main body 28a when being elastically deformed. For example, the foreign object blocking member 61 is attached to the inner surface side of the cover main body 28a, while being retained by the cover main body 28a by means of resilient force. The foreign object blocking member 61 is positioned and retained by the holding parts 128c of the cover main body 28a. Detailed explanation will be made below for the foreign object blocking member 61 in explaining the structure of a foreign object intrusion blocking structure 60 to be described.

As illustrated in FIGS. 1 and 2, the second side cover 18b is a member for covering a lateral side of the frame 17 on the same side as the handle 12. A resistance operating portion 23 is turnably mounted to the second side cover 18b. The resistance operating portion 23 serves to regulate the casting control mechanism 21.

The fishing rod attachment part 17d is integrally formed with the lower side coupling portion 17c. The spool 14 is disposed between the first side plate 17a and the second side plate 17b, while being coupled to the handle 12.

It should be noted that a level wind mechanism (not illustrated in the drawings), a rotation transmission mechanism (not illustrated in the drawings) and so forth are disposed in the interior of the reel unit 11. The level wind mechanism is configured to be actuated in conjunction with the spool 14. The rotation transmission mechanism is configured to transmit the rotation of the handle 12 to the spool 14.

<Structure of Spool Access Mechanism and Structure of Cover Open Mechanism>

As illustrated in FIG. 4, the spool access mechanism 30 is composed of the first side plate 17a (the frame 17), the spool support portion 15, the first side cover 18a, the cover opening and closing portion 16 and the attachment/detachment portion 19. Among these elements of the spool access mechanism 30, the first side plate 17a (the frame 17), the spool support portion 15, the first side cover 18a and the cover opening and closing portion 16 compose the cover open mechanism 50. In other words, the spool access mechanism 30 includes the cover open mechanism 50.

Thus, excluding the attachment/detachment portion 19, the structure of the cover open mechanism 50 is the same as that of the aforementioned spool access mechanism 30. Therefore, explanation will be hereinafter simultaneously made for the structure of the spool access mechanism 30 and that of the cover open mechanism 50.

It should be noted that the spool support portion 15, the attachment/detachment portion 19, the cover opening and closing portion 16 and the first side cover 18a will be hereinafter referred to as "an attachment/detachment unit 29". Further, explanation has been already made for the first side plate 17a and the first side cover 18a in explaining the reel unit 11. Therefore, explanation thereof will not be hereinafter made.

The spool support portion 15 supports the spool 14 in a rotatable state. When described in detail, the spool support portion 15 supports the spool 14 in a rotatable state through the spool shaft 26. The spool support portion 15 is disposed in the interior of the first side plate 17a. When described in detail, the spool support portion 15 is disposed in the opening portion 27c of the first side plate 17a.

Figure 7:
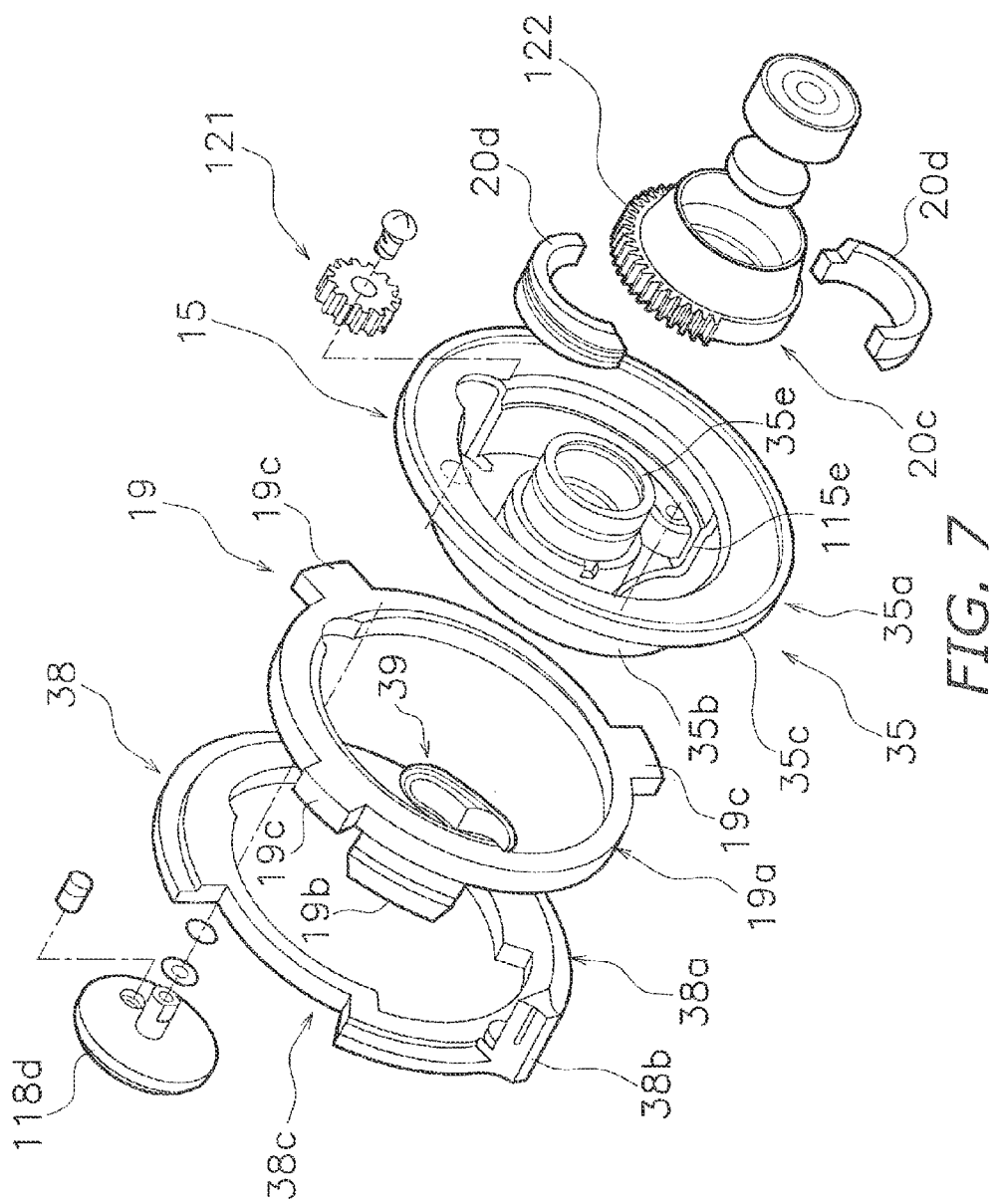
FIG. 7 is an exploded perspective view of an attachment/detachment unit (excluding the first side cover)

As illustrated in FIG. 7, the spool support portion 15 includes a base member 35 and the aforementioned brake drum 20c. The base member 35 has a base main body 35a and a bearing accommodating part 35e for accommodating the first bearing 25a.

The base main body 35a has a brake accommodating part 35b, a brimmed part 35c and the contact part 35d (see FIG. 4). The brake accommodating part 35b is a part for accommodating a brake cam 20d and the brake shoes 20b. The brake accommodating part 35b has a window part 115e formed for enabling access to the brake shoes 20b. The brake shoes 20b are set to be pivotable or non-pivotable through the window part 115e.

The brimmed part 35c is integrally formed with the outer periphery of the brake accommodating part 35b. The contact part 35d is an anti-rotation part for the first side cover 18a. The contact part 35d is integrally formed with the brake accommodating part 35b so as to outwardly protrude therefrom. For example, when the first side cover 18a is opened, the protruding part 128b (see FIG. 6A) of the first side cover 18a is contacted to the contact part 35d of the spool support portion 15. Thus, further rotation of the first side cover 18a is prevented in the position. Further, the protruding part 128b of the first side cover 18a is also used as a part to which an urging member 37 is hooked.

The bearing accommodating part 35e is integrally formed with the inner periphery of the base main body 35a. When described in detail, the bearing accommodating part 35e is integrally formed with the brake accommodating part 35b of the base main body 35a so as to protrude therefrom in a direction along the spool shaft 26. The base member 35 supports one end (i.e., the right end in FIG. 2) of the spool shaft 26 in a rotatable state through the first bearing 25a (see FIG. 2) accommodated in the bearing accommodating part 35e.

The brake drum 20c is engaged with the base member 35 through the brake cam 20d. The brake cam 20d is disposed between the inner periphery of the brake drum 20c and the outer periphery of the bearing accommodating part 35e. A cam groove is formed on the outer periphery of the brake cam 20d, whereas a cam protrusion is formed on the inner periphery of the brake drum 20c so as to be engaged with the cam groove.

For example, when the brake operating portion 118d is operated and turned, a first gear portion 121 and a second gear portion 122 of the brake drum 20c are configured to be rotated. The first gear portion 121 is fixed to the brake operating portion 118d, whereas the second gear portion 122 is meshed with the first gear portion 121. In conjunction with the rotation, the brake drum 20c is rotated. Further, the brake drum 20c is moved through the brake cam 20d in either a direction closer to the spool 14 or a direction away from the spool 14. Accordingly, the brake drum 20c is positioned and braking force is determined, which is to be applied to the spool 14 when the brake shoes 20b are contacted to the brake drum 20.

As illustrated in FIG. 4, the cover opening and closing portion 16 is configured to be capable of opening the first side cover 18a. The cover opening and closing portion 16 is disposed in the opening portion 27c of the first side plate 17a, while being disposed between the spool 14 and the first side cover 18a. The cover opening and closing portion 16 is engaged with the spool support portion 15 and the first side cover 18a. For example, the cover opening and closing portion 16 is engaged with the brake accommodating part 35b of the spool support portion 15 and the support part 28b (see FIG. 6A) of the first side cover 18a.

Figure 8:
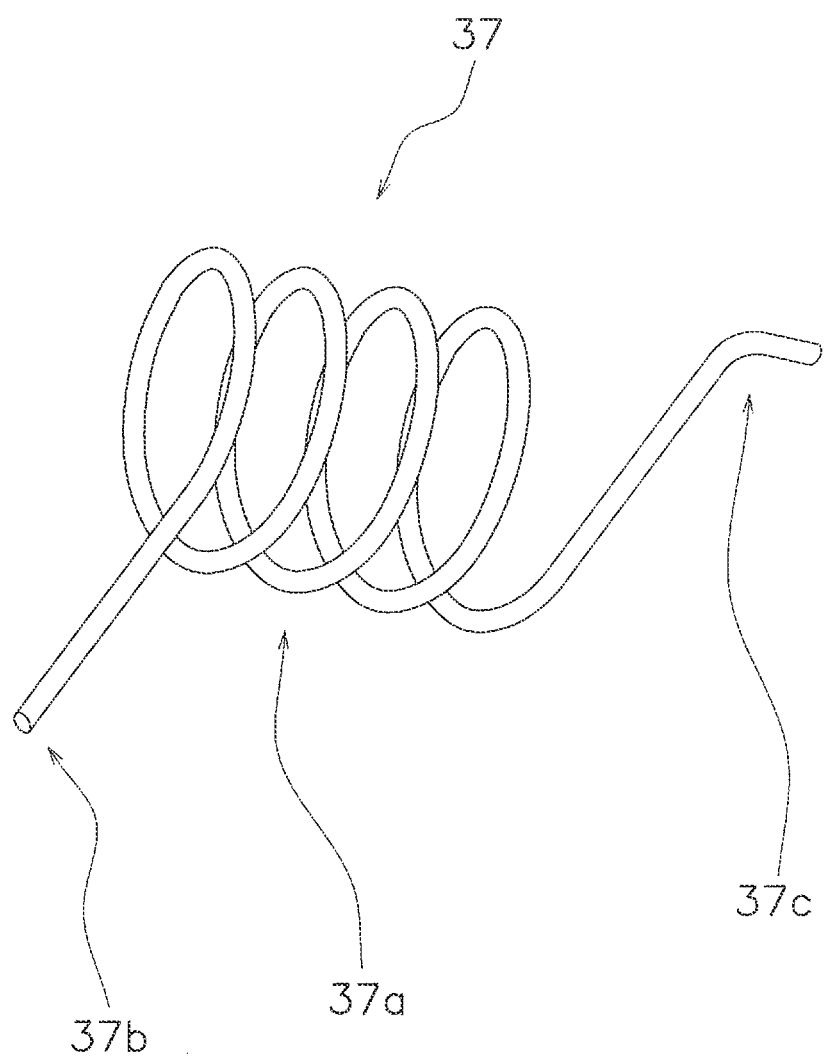
FIG. 8 is a perspective view of an urging member.

As illustrated in FIGS. 4 to 10, the cover opening and closing portion 16 includes a cover opening and closing structure 36 and the urging member 37 (see FIG. 8). The cover opening and closing structure 36 is capable of opening and closing the first side cover 18a. For example, when the position of the first side cover 18a transitions between a cover closed position and a cover openable position, the cover opening and closing structure 36 supports the first side cover 18a such that the first side cover 18a is allowed to proceed in the direction away from the spool 14 and retract in the direction closer to the spool 14. On the other hand, when the position of the first side cover 18a transitions between the cover openable position and a cover opened position, the cover opening and closing structure 36 supports the first side cover 18a such that the first side cover 18a is allowed to pivot. Further, the cover opening and closing structure 36 is engaged with the spool support portion 15 and the first side cover 18a.

It should be noted that the cover closed position is defined as a position taken by the first side cover 18a disposed in the opening portion 27c of the first side plate 17a. Further, the cover openable position is defined as a position taken by the first side cover 18a moved in the direction away from the spool 14, i.e., a position taken by the first side cover 18a when a predetermined clearance is produced between the first side cover 18a and the tubular part 27b of the first side plate 17a. Yet further, the cover opened position is defined as a position taken by the first side cover 18a when the first side cover 18a is opened.

The cover opening and closing structure 36 includes a pivot member 38 and a coupling member 40. The pivot member 38 is a member configured to be operated for opening the first side cover 18a. The pivot member 38 is pivotably mounted to the spool support portion 15.

Figure 9:
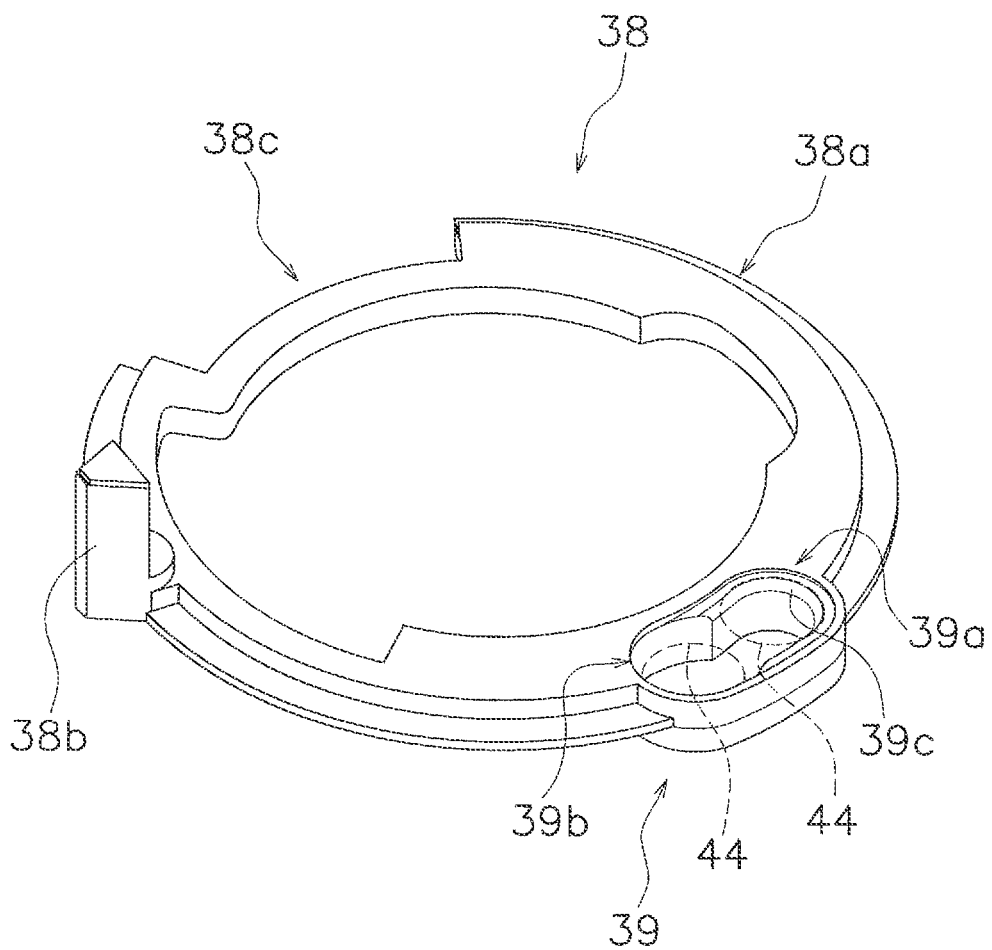
FIG. 9 is a perspective view of a pivot member.

As illustrated in FIGS. 5, 7 and 9, the pivot member 38 has a pivot main body 38a (an exemplary main body of a pivot member) formed in a substantially annular shape, the pivot operating knob 38b, a cutout 38c, and an elongated aperture part 39 for positioning.

The pivot main body 38a is pivotably mounted to the spool support portion 15. The pivot main body 38a is rotatable with respect to the spool support portion 15, while being opposed to the brimmed part 35c of the spool support portion 15. The brake accommodating part 35b of the spool support portion 15 is disposed in the inner periphery of the pivot main body 38a. The rotary range (i.e., the pivot range) of the pivot member 38 is set to be within a range of the pivot-member elongated aperture 22b (see FIG. 3) bored in the first side plate 17a.

The pivot operating knob 38b serves to cause the pivot member 38 to pivot. The pivot operating knob 38b is formed on the outer periphery of the pivot main body 38a, while extending in a direction along the spool shaft 26. The pivot operating knob 38b is disposed in the pivot-member elongated aperture 22b (see FIG. 3). When the pivot operating knob 38b is operated, the pivot member 38 is configured to pivot. The cutout 38c is formed along the outer periphery of the pivot main body 38a. An operating knob 19b for attachment/detachment (to be described) is disposed in the cutout 38c.

As illustrated in FIG. 9, the positioning elongated aperture part 39 is formed in the pivot main body 38a, while extending in the circumferential direction. A second coupling member 42 (to be described) is disposed in the positioning elongated aperture part 39 (see FIG. 5). The second coupling member 42 is movable in the positioning elongated aperture part 39. The positioning elongated aperture part 39 has a first aperture 39a and a second aperture 39b. The first aperture 39a is formed on one end side of the positioning elongated aperture part 39. The second aperture 39b is formed on the other end side of the positioning elongated aperture part 39. The inner diameter of the second aperture 39b is greater than that of the first aperture 39a.

Here, the position, taken by the pivot member 38 when the first side cover 18a is closed, is defined as a first position. By contrast, the position, taken by the pivot member 38 when the first side cover 18a is openable, is defined as a second position. While taking the first or second position, the pivot member 38 is configured to be positioned by the coupling member 40 to be described.

As illustrated in FIG. 5, while coupling the spool support portion 15 and the first side cover 18a, the coupling member 40 supports the first side cover 18a such that the first side cover 18a is openable and closable in conjunction with the pivot of the pivot member 38. The coupling member 40 includes a first coupling member 41 and the second coupling member 42 (an exemplary support portion in the cover open mechanism 50).

The first coupling member 41 is mounted to the spool support portion 15, while being disposed between the pivot member 38 and the first side cover 18a. When described in detail, the first coupling member 41 is formed in a plate shape. A part of the first coupling member 41 is mounted to the brake accommodating part 35b of the spool support portion 15. Further, the remaining part of the first coupling member 41, excluding the part mounted to the brake accommodating part 35b, is engaged with the second coupling member 42. For example, the first coupling member 41 has an aperture 41a. The second coupling member 42 is rotatably disposed in the aperture 41a.

The second coupling member 42 is engaged with the first coupling member 41. For example, the second coupling member 42 is rotatably disposed in the aperture 41a of the first coupling member 41. Further, the second coupling member 42 supports the first side cover 18a in an openable/closable state, while being coupled to the support part 28b (see FIG. 6A) of the first side cover 18a. Yet further, the second coupling member 42 positions the pivot member 38. When described in detail, the second coupling member 42 is movable within the positioning elongated aperture part 39 in conjunction with the pivot of the pivot main body 38a of the pivot member 38.

When taking the first position, the pivot member 38 is configured to be positioned by the second coupling member 42 on one end side in the positioning elongated aperture part 39. By contrast, when taking the second position, the pivot member 38 is configured to be positioned by the second coupling member 42 on the other end side in the positioning elongated aperture part 39.

Figure 10:
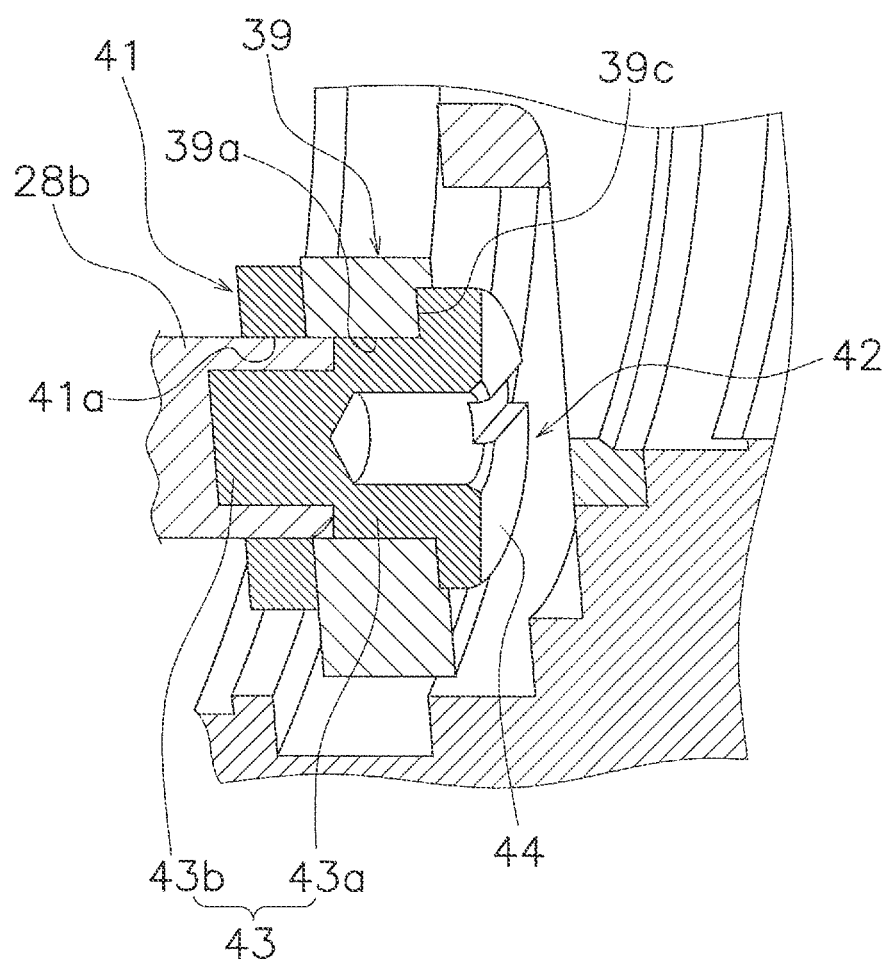
FIG. 10 is a diagram illustrating an engaged state of a coupling member.

Specifically as illustrated in FIG. 10, the second coupling member 42 has a shaft part 43 and a head part 44 (an exemplary enlarged part). The shaft part 43 is rotatably disposed in the aperture 41a of the first coupling member 41. The shaft part 43 has a shaft main body 43a and a male threaded part 43b. The Shaft main body 43a is a part formed between the head part 44 and the male threaded part 43b. The shaft main body 43a can be fitted to the positioning elongated aperture part 39 formed in the pivot member 38. When described in detail, in the closed state of the first side cover 18a, the shaft main body 43a is configured to be disposed in the first aperture 39a of the positioning elongated aperture part 39. The male threaded part 43b of the shaft part 43 is screwed into the support part 28b (the female threaded part) of the first side cover 18a. Accordingly, the second coupling member 42 is attached to the first side cover 18a.

The head part 44 is a part enlarged in comparison with the shaft part 43. The head part 44 is integrally formed with the shaft part 43 on one end of the shaft part 43. As depicted with dashed lines in FIG. 9, the head part 44 can be engaged with the positioning elongated aperture part 39. When described in detail, while the pivot member 38 takes the first position (i.e., in the closed state of the first side cover 18a), the head part 44 is configured to be engaged with the first aperture 39a of the positioning elongated aperture part 39 (see FIG. 10). By contrast, while the pivot member 38 takes the second position (i.e., in the openable state of the first side cover 18a), the head part 44 is configured to be engaged with the second aperture 39b of the positioning elongated aperture part 39.

Now, explanation will be made for the relation between the second coupling member 42 and the pivot member 38 and for positioning of the pivot member 38. As illustrated in FIG. 10, when the pivot member 38 takes the first position, the shaft part 43 (the shaft main body 43a) of the second coupling member 42 is disposed in the first aperture 39a of the positioning elongated aperture part 39. Further, at this time, the head part 44 of the second coupling member 42 is engaged with an edge 39c of the first aperture 39a of the positioning elongated aperture part 39.

With the structure, in the closed state of the first side cover 18a, i.e., while the outer periphery of the first side cover 18a is contacted to the tubular part 27b of the first side plate 17a, the pivot member 38 is interposed and held between the first side cover 18a and the second coupling member 42 (the head part 44). Thus, the pivot member 38 is positioned, while being retained.

By contrast, when the position of the pivot member 38 is changed from the first position and is set to the second position, the head part 44 of the second coupling member 42 is configured to be disposed in the second aperture 39b of the positioning elongated aperture part 39 as illustrated in FIG. 9. Under the condition, the pivot member 38 is unable to pivot because the head part 44 of the second coupling member 42 is disposed in the second aperture 39b of the positioning elongated aperture part 39. In other words, the pivot member 38 is positioned by the second coupling member 42 (the head part 44).

Further, under the condition, the head part 44 of the second coupling member 42 is allowed to proceed in the direction away from the spool support portion 15 and retract in the direction closer to the spool support portion 15, while being disposed in the second aperture 39b of the positioning elongated aperture part 39. However, the first coupling member 41 is disposed between the first side cover 18a and the head part 44 of the second coupling member 42. Hence, the second coupling member 42 is retained by the first coupling member 41. It should be noted that, the second coupling member 42 supports the first side cover 18a in a pivotable state, while the head part 44 thereof is contacted to the first coupling member 41.

The urging member 37 illustrated in FIG. 8 is a member for urging the first side cover 18a. The urging member 37 is configured to change the position of the first side cover 18a from the cover closed position for closing the opening portion 27c of the first side plate 17a to the cover opened position for opening at least a part of the opening portion 27c of the first side plate 17a. Specifically, the urging member 37 is configured to firstly change the position of the first side cover 18a from the cover closed position to the cover openable position whereby the opening portion 27c of the first side plate 17a can be opened. Next, the urging member 37 is configured to change the position of the first side cover 18a from the cover openable position to the cover opened position.

The urging member 37 urges the first side cover 18a so as to make the first side cover 18a openable, while being disposed between the first side cover 18a and the cover opening and closing structure 36. When described in detail, the urging member 37 urges the first side cover 18a in the direction away from the spool 14, while being disposed between the first side cover 18a and the first coupling member 41. Further, the urging member 37 urges the first side cover 18a so as to make the first side cover 18a openable, while being engaged with the first side cover 18a and the first coupling member 41.

As illustrated in FIG. 8, the urging member 37 has a torsion spring part 37a, a first lock part 37b and a second lock part 37c. While being disposed between the first side cover 18a and the first coupling member 41, the torsion spring part 37a is disposed on at least either of the outer periphery of the support part 28b of the first side cover 18a and that of the shaft part 43 (the shaft main body 43a) of the second coupling member 42. For example, when the second coupling member 42 is disposed in the first aperture 39a, the torsion spring part 37a is configured to be disposed on the outer periphery of the support part 28b. By contrast, when the second coupling member 42 is disposed in the second aperture 39b, the torsion spring part 37a is configured to be disposed on the outer periphery of the support part 28b and that of the shaft part 43.

The torsion spring part 37a is extendable and contractable on the aforementioned outer peripheries. For example, the torsion spring part 37a is compressed between the first side cover 18a and the first coupling member 41, while the head part 44 of the second coupling member 42 is engaged with the edge 39c of the first aperture 39a, i.e., while the first side cover 18a is closed. When the pivot member 38 is rotated from the condition and the head part 44 of the second coupling member 42 reaches the second aperture 39b, the torsion spring part 37a urges the first side cover 18a in the direction away from the spool support portion 15. Accordingly, the head part 44 of the second coupling member 42 is contacted to the first coupling member 41. Thus, the position of the first side cover 18a is changed from the cover closed position to the cover openable position.

Further, the torsion spring part 37a applies the reaction force of the torsional force thereof to the first side cover 18a. When described in detail, the first lock part 37b is locked to (or held by) the first side cover 18a (e.g., the protruding part 128b of the first side cover 18a). The second lock part 37c is locked (or hooked) to the cover opening and closing structure 36 (e.g., the first coupling member 41). For example, the second lock part 37c is hooked in a lock aperture 41b (see FIG. 5) of the first coupling member 41. Accordingly, the torsion spring part 37a applies the reaction force of the torsional force thereof to the first side cover 18a, where the second lock part 37c (the lock aperture 41b) serves as a spring support. For example, when the first side cover 18a has taken the cover openable position, the position of the first side cover 18a is changed from the cover openable position to the cover opened position by means of the reaction force of the torsional force of the torsion spring part 37a.

Thus, the first side cover 18a is configured to be opened, while the position thereof is sequentially changed by the urging member 37 in the order of the cover closed position, the cover openable position, and the cover opened position.

As illustrated in FIGS. 4 and 5, the attachment/detachment portion 19 is disposed in the opening portion 27c of the first side plate 17a, while being disposed between the spool 14 and the first side cover 18a. Further as illustrated in FIG. 7, the attachment/detachment portion 19 is disposed between the spool support portion 15 and the pivot member 38. Specifically, the attachment/detachment portion 19 is disposed between the brimmed part 35c of the spool support portion 15 and the pivot main body 38a of the pivot member 38. The attachment/detachment portion 19 is rotatable, while being arranged as described above.

The attachment/detachment portion 19 is pivotably and detachably attached to the first side plate 17a. The attachment/detachment portion 19 is engaged with the spool support portion 15 and the cover opening and closing structure 36. The attachment/detachment portion 19 is pivotable, while the first side cover 18a is opened. Further, under the condition, the attachment/detachment portion 19 allows the spool support portion 15, the first side cover 18a and the cover opening and closing portion 16 to be attached to or detached from the first side plate 17a.

As illustrated in FIG. 7, the attachment/detachment portion 19 is formed in a substantially annular shape. The attachment/detachment portion 19 has an annular part 19a (an exemplary main body of the attachment/detachment portion 19) formed in a substantially annular shape, the attachment/detachment operating knob 19b and a plurality of (e.g., three) bayonet protrusions 19c. The attachment/detachment operating knob 19b is integrally formed with the outer periphery of the annular part 19a. The attachment/detachment operating knob 19b is disposed in the cutout 38c of the pivot member 38. For example, the attachment/detachment operating knob 19b has a groove (not illustrated in the drawings) formed on the inner periphery thereof. The groove is fitted to the cutout 38c of the pivot member 38, and accordingly, the pivot member 38 is retained in the spool shaft direction. It should be noted that the pivot range of the attachment/detachment portion 19 is set to be within a range of the circumferential length of the cutout 38c.

The plural (e.g., three) bayonet protrusions 19c are integrally formed with the outer periphery of the annular part 19a so as to outwardly protrude therefrom. On the other hand, bayonet grooves 27d (see FIG. 4) are formed in the tubular part 27b of the first side plate 17a. When the attachment/detachment portion 19 is rotated in response to an operation of the attachment/detachment operating knob 19b, the bayonet protrusions 19c are configured to be engaged with the bayonet grooves 27d. Accordingly, the attachment/detachment unit 29 (i.e., the spool support portion 15, the first side cover 18a, the cover opening and closing portion 16 and the attachment/detachment portion 19) is attached to the tubular part 27b of the first side plate 17a. By contrast, when the attachment/detachment portion 19 is rotated oppositely to the aforementioned direction in response to an operation of the attachment/detachment operating knob 19b, the bayonet protrusions 19c and the bayonet grooves 27d are disengaged from each other. Accordingly, the attachment/detachment unit 29 is detached from the tubular part 27b of the first side plate 17a.

Thus, the spool support portion 15, the attachment/detachment portion 19, the cover opening and closing portion 16, and the first side cover 18a can be attached or detached as a single unit, i.e., as the attachment/detachment unit 29. Therefore, the interior of the dual-bearing reel 10 is easily accessible.

<Assembling Work and Action of Spool Access Mechanism and Cover Open Mechanism>

The attachment/detachment unit 29, included in the spool access mechanism 30, is assembled and acts as follows.

First, the attachment/detachment portion 19 and the pivot member 38 of the cover opening and closing portion 16 are combined. Specifically, the attachment/detachment portion 19 and the pivot member 38 are combined such that the operating knob (the attachment/detachment operating knob 19b) of the attachment/detachment portion 19 is disposed in the cutout 38c of the pivot member 38. More specifically, the attachment/detachment portion 19 is assembled to the pivot member 38 such that the groove (not illustrated in the drawings) of the attachment/detachment operating knob 19b is fitted to the cutout 38c. Accordingly, the pivot member 38 of the cover opening and closing portion 16 is retained by the attachment/detachment portion 19.

Next, while the attachment/detachment portion 19 and the pivot member 38 are combined, the attachment/detachment portion 19 is disposed on the spool support portion 15 while being opposed to the brimmed part 35c of the spool support portion 15. In other words, the attachment/detachment portion 19 is disposed on the outer periphery of the brake accommodating part 35b of the spool support portion 15. Accordingly, the attachment/detachment portion 19 and the pivot member 38 are disposed on the outer periphery of the brake accommodating part 35b of the spool support portion 15.

Next, the second coupling member 42 of the cover opening and closing portion 16 is attached to the first side cover 18a (including the foreign object blocking member 61) through the first coupling member 41 of the cover opening and closing portion 16. Specifically, the shaft part 43 of the second coupling member 42 is inserted through the aperture 41a of the first coupling member 41. Then, the shaft part 43 (the male threaded part 43b) of the second coupling member 42 is screwed into the support part 28b of the first side cover 18a, while the first lock part 37b of the urging member 37 is locked to (or held by) the protruding part 128b of the first side cover 18a whereas the torsion spring part 37a of the urging member 37 is disposed on the support part 28b of the first side cover 18a. Further, the second lock part 37c of the urging member 37 is hooked in the lock aperture 41b of the first coupling member 41.

Subsequently, while the first side cover 18a is opened, the first coupling member 41 is fixed to the brake accommodating part 35b of the spool support portion 15 by a fixation member (e.g., a screw 47). When described in detail, the first coupling member 41 is fixed to the brake accommodating part 35b of the spool support portion 15 by the screw 47, while the head part 44 of the second coupling member 42 is disposed in the second aperture 39b of the positioning elongated aperture part 39 formed in the pivot member 38.

Thus, the attachment/detachment unit 29 (i.e., the spool support portion 15, the attachment/detachment portion 19, the cover opening and closing portion 16 (the pivot member 38 and the coupling member 40) and the first side cover 18a) is assembled.

Subsequently, the attachment/detachment unit 29 is attached to the first side plate 17a. For example, the attachment/detachment operating knob 19b, disposed in the cutout 38c of the pivot member 38, is rotated while the pivot operating knob 38b is disposed in the pivot-member elongated aperture 22b. Thus, the attachment/detachment unit 29 and the first side plate 17a are bayonet-coupled. In other words, the attachment/detachment unit 29 is attached to the first side plate 17a by fitting the bayonet protrusions 19c of the attachment/detachment portion 19 included in the attachment/detachment unit 29 to the bayonet grooves 27d of the tubular part 27b of the first side plate 17a.

It should be noted that under the condition, the first side cover 18a is opened while being urged by the urging member 37. Further under the condition, the pivot member 38 takes the first position.

Subsequently, when the first side cover 18a is rotated about the axis of the second coupling member 42, the urging member 37 is twisted and the first side cover 18a is disposed in opposition to the tubular part 27b of the first side plate 17a. Under the condition, a predetermined clearance is produced between the first side cover 18a and the tubular part 27b of the first side plate 17a. Further, when the first side cover 18a is inwardly pushed toward the spool support portion 15, the urging member 37 is compressed and the first side cover 18a is contacted to the tubular part 27b of the first side plate 17a.

Under the condition, when the pivot operating knob 38b is operated in one direction along the pivot-member elongated aperture 22b, the head part 44 of the second coupling member 42 is moved from the second aperture 39b to the first aperture 39a within the positioning elongated aperture part 39 and is disposed on the edge 39c of the first aperture 39a. Accordingly, the first side cover 18a is held by the first side plate 17a (the tubular part 27b). While covering the opening portion 27c of the first side plate 17a. The condition corresponds to the closed state of the first side cover 18a. Under the condition, the spool 14, the spool support portion 15 and the first side cover 18a are disposed substantially concentric to each other in a view seen in the spool shaft direction.

By contrast, when the pivot operating knob 38b is operated in the opposite direction along the pivot-member elongated aperture 22b while the first side cover 18a is closed, the head part 44 of the second coupling member 42 is moved from the edge 39c of the first aperture 39a to the second aperture 39b within the positioning elongated aperture part 39. The second coupling member 42 is thereby urged together with the first side cover 18a in the direction away from the spool support portion 15 by means of the extension force of the urging member 37. Accordingly, the head part 44 of the second coupling member 42 is contacted to the first coupling member 41, while being disposed inside the second aperture 39b of the positioning elongated aperture part 39. In other words, the first side cover 18a is moved in the direction away from the spool 14. Thus, the position of the first side cover 18a is changed from the cover closed position to the cover openable position.

Subsequently, when the position of the first side cover 18a has been changed into the cover openable position, the first side cover 18a is rotated about the second coupling member 42 by means of the reaction force of the torsional force of the urging member 37. Accordingly, the position of the first side cover 18a is changed from the cover openable position to the cover opened position. In other words, the first side cover 18a is opened.

Subsequently, when the attachment/detachment operating knob 19b is operated, the bayonet coupling between the attachment/detachment unit 29 and the first side plate 17a is released. Under the condition, when the attachment/detachment unit 29 is pulled out in the direction away from the spool 14, the attachment/detachment unit 29 is detached from the first side plate 17a.

It should be noted that, the attachment/detachment unit 29 is kept attached to the first side plate 17a unless the attachment/detachment operating knob 19b is operated while the first side cover 18a is opened. Under the condition, a user is allowed to set the brake shoes 20b to be pivotable or non-pivotable through the window part 115e of the spool support portion 15.

<Structure of Foreign Object Intrusion Blocking Structure>

The foreign object intrusion blocking structure 60 serves to prevent intrusion of a foreign object into the interior of the dual-bearing reel 10. The foreign object intrusion blocking structure 60 is composed of the first side plate 17a (the frame 17) and the first side cover 18a. As described above, the first side cover 18a has the cover main body 28a (see FIG. 4) with the plural apertures 128a and the foreign object blocking member 61 (see FIG. 6A) for preventing intrusion of a foreign object through the plural apertures 128a.

It should be noted that the first side plate 17a and the first side cover 18a have been already explained above in explaining the reel unit 11. Therefore, explanation will not be hereinafter made for the first side plate 17a and the first side cover 18a. Further, the foreign object blocking member 61 is a member included in the first side cover 18a. The basic structure thereof has been already explained above in explaining the reel unit 11. Therefore, explanation will be hereinafter made for the structure of the foreign object blocking member 61 except for the basic structure thereof.

While being elastically deformed, the foreign object blocking member 61 is attached to the inner surface side of the cover main body 28a, and is held by the cover main body 28a by means of the resilient force thereof. For example, at least a part of the outer periphery of the foreign object blocking member 61 has a second curvature less than the first curvature of the cover main body 28a. In other words, at least a part of the outer periphery of the foreign object blocking member 61 is formed in a shape with a second curvature radius greater than the first curvature radius of the cover main body 28a. Therefore, as illustrated in FIG. 6A, when the foreign object blocking member 61 is elastically deformed, an outer periphery 28d (a part with the second curvature) of the foreign object blocking member 61 is attached to an outer periphery 128d (a part with the first curvature) of the cover main body 28a. The outer periphery 128d of the cover main body 28a is a part of the protruding part 128b of the cover main body 28a.

Figure 6B:
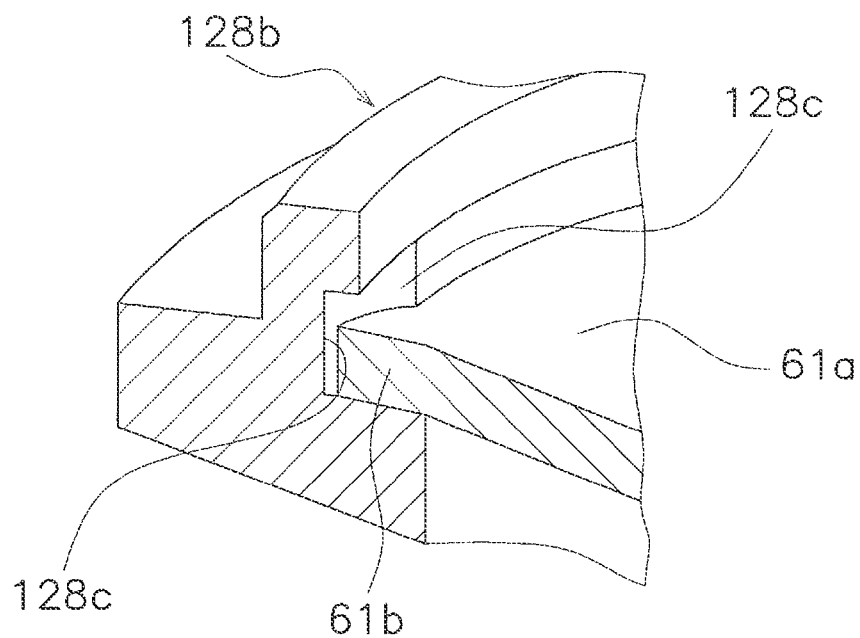
FIG. 6B is a partial cross-sectional view of the first side cover (without any protrusion)
Figure 6C:
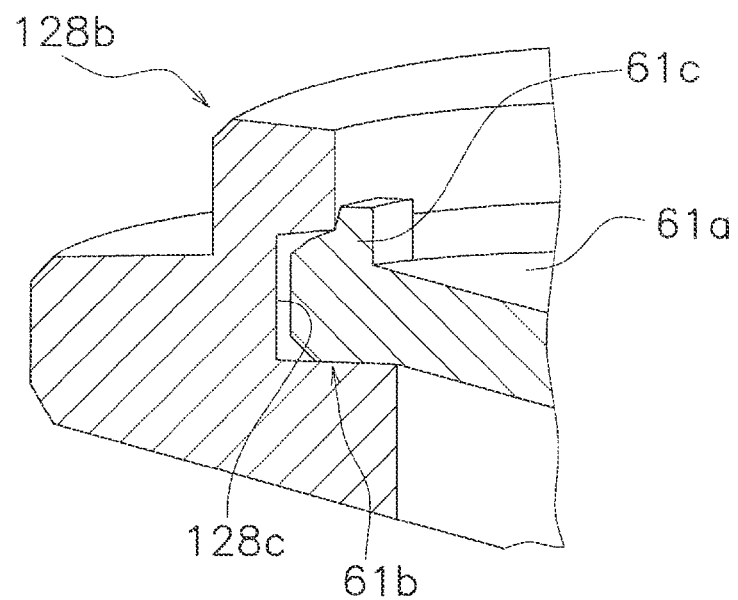
FIG. 6C is a partial cross-sectional view of the first side cover part (with a protrusion)

As illustrated in FIGS. 6A to 6C, the foreign object blocking member 61 is a plate member formed in a substantially C-shape. The foreign object blocking member 61 has a main body 61a and a plurality of engaging parts 61b. The main body 61a is a plate part formed in a C-shape. The engaging parts 61b are engaged with the holding parts 128c of the cover main body 28a. It should be noted that, as described above, each holding part 128c of the cover main body 28a is a concave part formed in a recessed shape.

The main body 61a is attached to the cover main body 28a, for instance, when being elastically deformed toward the curvature center of the second curvature. The plural (e.g., three) engaging parts 61b are respectively integrally formed with the outer periphery (a part with the second curvature) of the main body 61a, while being aligned at predetermined intervals. Each engaging part 61b is a convex part (an exemplary second convex part) outwardly protruding from the outer periphery of the main body 61a.

As illustrated in FIG. 6C, at least one of the three engaging parts 61b has a protrusion 61c. For example, one of the three engaging parts 61b herein has the protrusion 61c. As illustrated in FIG. 6B, two engaging parts 61b without the protrusion 61c are disposed in the holding parts 128c of the cover main body 28a. By contrast, one engaging part 61b with the protrusion 61c is fitted to the relevant one of the holding parts 128c of the cover main body 28a. When described in detail, the engaging part 61b with the protrusion 61c is fitted to the relevant holding part 128c of the cover main body 28a, while the protrusion 61c of the engaging part 61b is contacted to the wall of the relevant holding part 128c. Thus, the foreign object blocking member 61 is held by the cover main body 28a by means of the arrangement and the fitting of the engaging parts 61b to the holding parts 128c of the cover main body 28a and the aforementioned resilient force of the main body 61a.

It should be noted that a structure has been herein exemplified that one of the three engaging parts 61b has the protrusion 61c. However, each of two or all of the three engaging parts 61b may have the protrusion 61c.

<Features>

The aforementioned exemplary embodiment can be expressed as follows.

(A) The present dual-bearing reel 10 includes the reel unit 11, the spool 14, the handle 12 and the cover open mechanism 50. The reel unit 11 includes the frame 17 and the first side cover 18a. The frame 17 has the opening portion 27c. The first side cover 18a is allowed to be disposed in the opening portion 27c of the frame 17. The spool 14 is rotatably mounted to the frame 17. The handle 12 serves to rotate the spool 14.

The cover open mechanism 50 serves to open the first side cover 18a. The cover open mechanism 50 includes the frame 17, the first side cover 18a, the spool support portion 15 and the cover opening and closing portion 16. The spool support portion 15 supports the spool 14 in a rotatable state, while being mounted to the interior of the frame 17. The cover opening and closing portion 16 is disposed between the spool 14 and the first side cover 18a, while being disposed in the interior of the frame 17.

The cover opening and closing portion 16 includes the cover opening and closing structure 36 and the urging member 37. The cover opening and closing structure 36 is engaged with the spool support portion 15 and the first side cover 18a, and sets the opened/closed state of the first side cover 18a. The urging member 37 is disposed between the first side cover 18a and the cover opening and closing structure 36, and urges the first side cover 18a in an openable state. The first side cover 18a is configured to be prevented from rotating when any one of the first side cover 18a and the spool support portion 15 is engaged with the other of the first side cover 18a and the spool support portion 15.

In the present dual-bearing reel 10, the first side cover 18a is configured to be opened by the urging member 37 when the closed state of the first side cover 18a is released by the cover opening and closing structure 36. Further, the first side cover 18a is configured to be prevented from rotating when any one of the first side cover 18a and the spool support portion 15 is engaged with the other of the first side cover 18a and the spool support portion 15.

Thus, in the present dual-bearing reel 10, the first side cover 18a can be automatically opened, and further, the opened first side cover 18a can be retained while being prevented from rotating. In other words, in the present dual-bearing reel 10, the first side cover 18a can be easily opened. Further, in the present dual-bearing reel 10, the first side cover 18a can be retained while being opened. Accordingly, it is possible to enhance operability and workability for the internal structure of the dual-bearing reel 10.

(B) In the present dual-bearing reel 10, any one of the first side cover 18a and the spool support portion 15 has the protruding part 128b. On the other hand, the other of the first side cover 18a and the spool support portion 15 has the contact part 35d contactable to the protruding part 128b.

In the present dual-bearing reel 10, the first side cover 18a is prevented from rotating by contacting the protruding part 128b and the contact part 35d to each other. In other words, in the present dual-bearing reel 10, the first side cover 18a can be reliably retained while being opened. Accordingly, it is possible to enhance operability and workability for the internal structure of the dual-bearing reel 10.

(C) In the present dual-bearing reel 10, the urging member 37 is configured to change the position of the first side cover 18a from the closed position to the opened position. The closed position causes the first side cover 18a to close the opening portion 27c, whereas the opened position causes the first side cover 18a to at least partially open the opening portion 27c.

In the present dual-bearing reel 10, the urging member 37 is configured to change the position of the first side cover 18a from the closed position to the opened position. Therefore, a user can open the first side cover 18a not manually but automatically.

(D) In the present dual-bearing reel 10, the urging member 37 is configured to change the position of the first side cover 18a from the closed position to the openable position allowing the first side cover 18a to open the opening portion 27c. Further, the urging member 37 is configured to change the position of the first side cover 18a from the openable position to the opened position.

In the present dual-bearing reel, the urging member 37 is configured to change the position of the first side cover 18a in multiple stages in the sequential order of the closed position, the openable position and the opened position. Thus, the position of the first side cover 18a is changed from the closed position to the opened position via the openable position. Accordingly, the first side cover 18a can be smoothly and automatically opened by the urging member 37 even when the closed position and the opened position are greatly different from each other.

(E) In the present dual-bearing reel 10, the cover opening and closing structure 36 is configured to support the first side cover 18a such that the first side cover 18a is allowed to proceed in the direction away from the spool 14 and retract in the direction closer to the spool 14 when the position of the first side cover 18a transitions between the closed position and the openable position. Further, the cover opening and closing structure 36 is configured to support the first side cover 18a such that the first side cover 18a is allowed to pivot when the position of the first side cover 18a transitions between the openable position and the opened position. The urging member 37 is configured to urge the first side cover 18a such that the position of the first side cover 18a is allowed to be changed from the closed position to the openable position. Further, the urging member 37 is configured to urge the first side cover 18a such that the position of the first side cover 18a is allowed to be changed from the openable position to the opened position.

In the present dual-bearing reel, the urging member 37 is configured to urge the first side cover 18a in accordance with a form in which the first side cover 18a is supported by the cover opening and closing structure 36. Hence, the position of the first side cover 18a can be smoothly and automatically changed.

(F) In the present dual-bearing reel 10, the first side cover 18a has the support part 28b. The cover opening and closing structure 36 includes the second coupling member 42. The second coupling member 42 is mounted to the support part 28b, and supports the first side cover 18a such that the first side cover 18a is allowed to proceed and retract and is allowed to pivot. The urging member 37 is mounted to at least either of the outer periphery of the support part 28b and that of the second coupling member 42. The urging member 37 has the torsion spring part 37a, the first lock part 37b and the second lock part 37c. The torsion spring part 37a is extendable and contractable on at least either of the outer periphery of the support part 28b and that of the second coupling member 42. The first lock part 37b is locked to the first side cover 18a. The second lock part 37c is locked to the cover opening and closing structure 36.

In the present dual-bearing reel 10, the position of the first side cover 18a is changed from the closed position to the openable position by means of the extension force of the torsion spring part 37a. Further, the position of the first side cover 18a is changed from the openable position to the opened position by means of the reaction force of the torsional force of the torsion spring part 37a. Accordingly, the first side cover 18a can be smoothly and automatically opened by the single urging member 37, even when the position of the first side cover 18a is changed in multiple stages.

<Other Exemplary Embodiments>

One exemplary embodiment of the present invention has been explained above. However, the present invention is not limited to the aforementioned exemplary embodiment, and a variety of changes can be made without departing from the scope of the present invention. Especially, a plurality of exemplary embodiments and modifications described in the specification of the present application can be arbitrarily combined on an as-needed basis.

(a) The aforementioned exemplary embodiment has exemplified the structure that the protruding part 128b is formed on the first side cover 18a whereas the contact part 35d is formed on the spool support portion 15. Alternatively, the protruding part 128b may be formed on the spool support portion 15, whereas the contact part 35d may be formed on the first side cover 18a.

(b) The aforementioned exemplary embodiment has exemplified the structure that the foreign object blocking member 61 has the three engaging parts 61b. However, the number of the engaging parts 61b may be arbitrarily set without being limited to that set in the aforementioned exemplary embodiment. Further, the number of the engaging parts 61b with the protrusion 61c may be set to be plural without being limited to single.

(c) The aforementioned exemplary embodiment has exemplified the structure that the foreign object blocking member 61 is a plate member formed in a substantially C-shape. However, the foreign object blocking member 61 may be arbitrarily formed as long as the foreign object blocking member 61 is an elastic member, while the curvature (i.e., the second curvature) of the foreign object blocking member 61 is less than the curvature the first curvature) of the first side cover 18a.

(d) The aforementioned exemplary embodiment has exemplified the structure that the engaging parts 61b of the foreign object blocking member 61 are convex parts whereas the holding parts 128c of the first side cover 18a are concave parts. Alternatively, the engaging parts 61b of the foreign object blocking member 61 may be concave parts, whereas the holding parts 128c of the first side cover 18a may be convex parts.

INDUSTRIAL APPLICABILITY

The present invention is widely applicable to dual-bearing reels.

What is claimed is:

1. A dual-bearing reel, comprising:
a reel unit including a frame body and a cover portion, the frame body including an opening portion, the cover portion being configured to be disposed in the opening portion;
a spool being rotatably mounted on the frame body;
a handle configured to rotate the spool; and
a cover open mechanism configured to open the cover portion, and including a portion of the frame body, the cover portion, a spool support portion and a cover opening and closing portion, the spool support portion being mounted to an interior of the frame body and configured to support the spool in a rotatable state, the cover opening and closing portion being disposed between the spool and the cover portion in the interior of the frame body,
the cover opening and closing portion including a cover opening and closing structure and an urging member,
the cover opening and closing structure being engaged with the spool support portion and the cover portion and being configured to set an opened/closed state of the cover portion,
the urging member being disposed between the cover portion and the cover opening and closing structure, and being configured to urge the cover portion in an openable state, and
the cover portion being prevented from rotating when one of the cover portion and the spool support portion is engaged with the other of the cover portion and the spool support portion.

2. The dual-bearing reel according to claim 1, wherein
one of the cover portion and the spool support portion includes a protruding part, and
the other of the cover portion and the spool support portion includes a contact part contactable with the protruding part.

3. The dual-bearing reel according to claim 2, wherein
the urging member is configured to change a position of the cover portion from a closed position to an opened position, the closed position causing the cover portion to close the opening portion, the opened position causing the cover portion to at least partially open the opening portion.

4. The dual-bearing reel according to claim 1, wherein
the urging member is configured to change a position of the cover portion from a closed position to an opened position, the closed position causing the cover portion to close the opening portion, the opened position causing the cover portion to at least partially open the opening portion.

5. The dual-bearing reel according to claim 4, wherein
the urging member is configured to change the position of the cover portion from the closed position to an openable position in which the opening portion is openable, the urging member being configured to change the position of the cover portion from the openable position to the opened position.

6. The dual-bearing reel according to claim 5, wherein
the cover opening and closing structure is configured to support the cover portion such that the cover portion is capable of proceeding in a direction away from the spool and retracting in a direction closer to the spool between the closed position and the openable position, and the cover opening and closing structure is configured to support the cover portion such that the cover portion is capable of pivoting between the openable position and the opened position, and
the urging member is configured to urge the cover portion from the closed position to the openable position and from the openable position to the opened position.

7. The dual-bearing reel according to claim 6, wherein
the cover portion includes a coupling part to be coupled to the cover opening and closing structure,
the cover opening and closing structure includes a support portion, the support portion being mounted to the coupling part, the support portion supporting the cover portion, such that the cover portion is capable of proceeding and retracting and the cover portion is capable of pivoting,
the urging member includes a torsion spring part, a first lock part, and a second lock part, the torsion spring part being mounted to at least either of an outer periphery of the coupling part and an outer periphery of the support portion, the torsion spring part being extendable and contractable on the outer periphery, the first lock part being locked to the cover portion, the second lock part being locked to the cover opening and closing structure,
the position of the cover portion being capable of changing from the closed position to the openable position by an extension force of the torsion spring part, and
the position of the cover portion being capable of changing from the openable position to the opened position by a reaction force of a torsional force of the torsion spring part.

* * * * *